United States Patent [19]

Kashimoto et al.

[11] Patent Number: 4,458,108

[45] Date of Patent: Jul. 3, 1984

[54] PIERCING FLUID-TIGHT CONNECTOR

[75] Inventors: Hiroo Kashimoto; Tadatoshi Kosa; Akihiko Inque; Shigemitu Yamamoto; Katuhiko Kuroishi; all of Osaka, Japan

[73] Assignees: Sumitomo Electric Industries, Ltd.; Osaka Gas Company Limited, both of Osaka, Japan

[21] Appl. No.: 218,979

[22] Filed: Dec. 22, 1980

[30] Foreign Application Priority Data

Dec. 26, 1979 [JP] Japan .................. 54-181787

[51] Int. Cl.³ ........................... H01B 17/30
[52] U.S. Cl. .................... 174/152 R; 174/18
[58] Field of Search .............. 174/15 CA, 18, 151, 174/152 R, 152 E, 152 S

[56] References Cited

U.S. PATENT DOCUMENTS

| 724,945 | 4/1903 | Roche | 174/152 S |
| 2,238,396 | 4/1941 | Rabezzana et al. | 174/152 S |
| 2,906,908 | 9/1959 | Mallory | 174/152 S |

FOREIGN PATENT DOCUMENTS

| 1454227 | 8/1966 | France | 174/18 |
| 899738 | 6/1962 | United Kingdom | 174/152 R |
| 240066 | 3/1969 | U.S.S.R. | 174/152 R |

Primary Examiner—Laramie E. Askin
Attorney, Agent, or Firm—Sughrue, Mion, Zinn, Macpeak, and Seas

[57] ABSTRACT

A piercing fluid-tight connector device for use with ultra-low temperature cable for supplying external electrical current to a motor of a pump located in an accumulation tank or vessel. An insulating sleeve having a flange with a female thread at an inner peripheral surface of the sleeve is threadingly engaged with an electrically conductive rod with a male thread thereof. A sealing member is interposed between the sleeve and rod. The coupled sleeve and rod extend through an aperture in a main metal body with the flange of the insulating sleeve and the metal body being in contact with each other, preferably through a packing, so as to provide a fluid-tight structure.

6 Claims, 3 Drawing Figures

PIERCING FLUID-TIGHT CONNECTOR

BACKGROUND OF THE INVENTION

The present invention relates to a fluid-tight connecting and shielding device which passes through a separating wall. Such a device is particularly adapted for use in an electrical cable circuit for supplying external electric current to a motor of a pump located in an accumulation tank or vessel. This pump is provided to pump liquefied gas having an ultra-low temperature such as LPG or LNG stored in the tank. The fluid-tight device provides high efficiency and easy assembly with a compact, low-cost structure.

A conventional connector device requires a large number of components and is bulky. It is a primary object of the invention to provide a piercing fluid-tight connector device which is compact and uses fewer components than conventional devices.

SUMMARY OF THE INVENTION

In accordance with this and other objects of the invention, there is provided a piercing fluid-tight connector device for use with ultra-low temperature cable including an insulating sleeve having a flange with the insulating sleeve having a female thread at an inner peripheral surface, an electrically conductive rod having a male thread at an outer periphery thereof with the male thread threadingly engaged with the female thread to integrally couple the sleeve and rod, a sealing member interposed between the sleeve and rod, a main metal body through which the integrally coupled sleeve and rod extend, and a metal support fixedly secured to the main metal body by at least one bolt. The main metal body and the flange of the insulating sleeve are in contact with each other in such a manner as to provide a fluid-tight structure. If desired, a packing can be inserted between the flange and the main metal body. Also, a heat-shrinkable tape can be wound around that portion of the insulating sleeve which is exposed to the atmosphere.

DESCRIPTION OF THE PREFERRED EMBODIMENTS

The invention will be explained with reference to the drawings.

Figure 1:
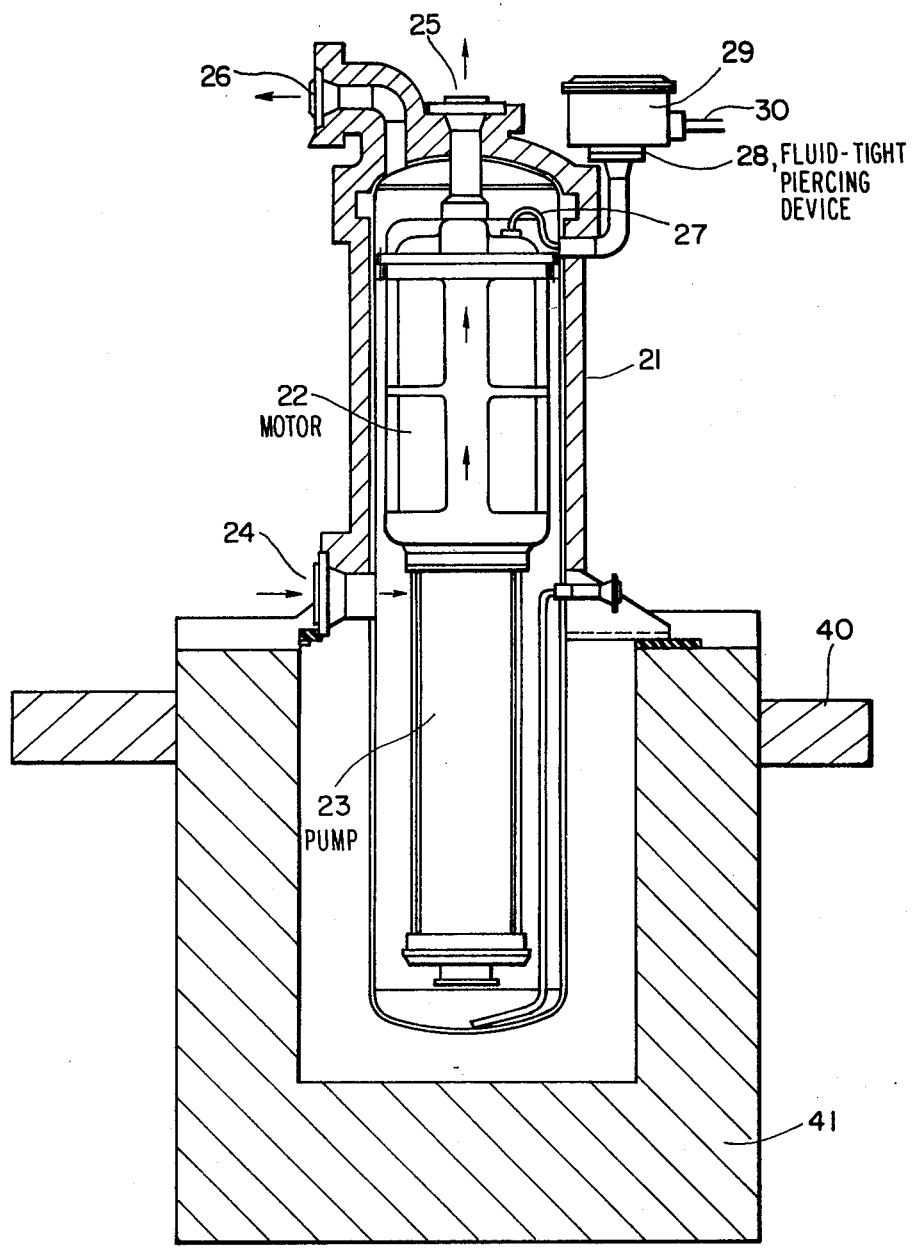
FIG. 1 is an explanatory view, partly in cross-section, of a LNG pump.

FIG. 1 is an explanatory view showing an LNG accumulation tank in which an LNG pump 23 is provided. Reference numeral 21 designates a cooling jacket, 22 a motor portion for driving the pump, 23 the pump, 24 an inlet port, 25 an outlet port, 26 a gas discharge port, 27 an ultra-low temperature cable, 28 a fluid-tight piercing device, 29 a connection box for providing an electrical connection to an external cable, and 30 an external power supply cable. LNG stored within a tank is taken into the inlet port 24 and is discharged from the outlet port 25 by means of the pump 23 driven by the motor 22 with the LNG moving in the direction indicated by the arrows in FIG. 1. Reference numeral 40 designates a ground surface and 41 a pump base.

Figure 2:
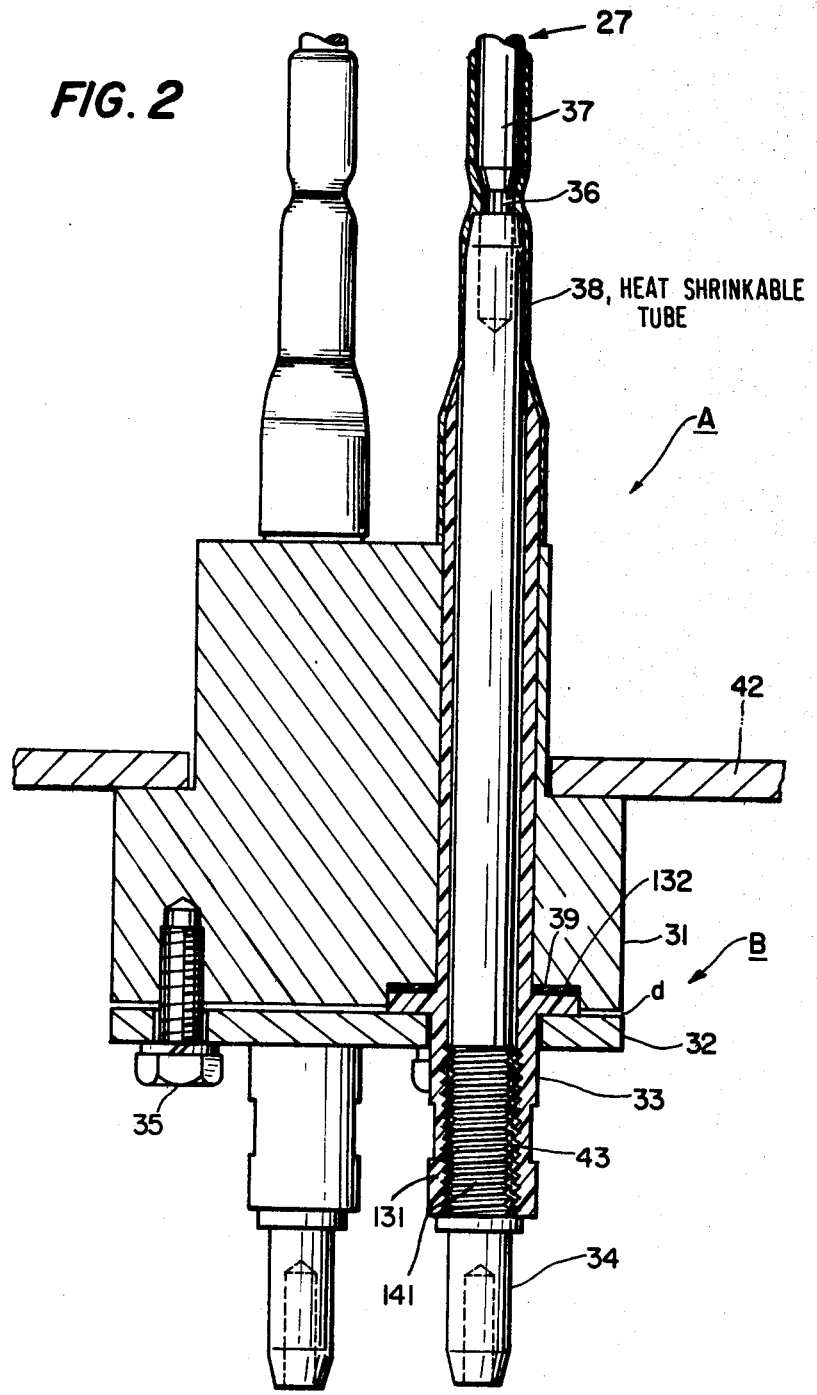
FIG. 2 is an partially enlarged view, partly in cross-section, showing a fluid-tight piercing device for use with ultra-low temperature cable according to the invention.

The invention relates most directly to the fluid-tight piercing device 28 shown in FIG. 2. The invention will be described with reference to FIG. 2 in which an enlarged explanatory view is shown of a preferred embodiment of a piercing fluid-tight device.

An insulating sleeve 33 is formed with a female thread 131 on its inner peripheral surface. An electroconductive rod 34 has a male thread 141 formed on its outer peripheral surface adapted to threadingly engage the female thread via a sealing member 43 provided to maintain fluid-tightness of the integrally coupled electroconductive rod 34 and insulating sleeve 33.

A main metal body 31 is formed with a seat portion to provide fitting engagement with a flange 132 of the insulating sleeve 33. Thus, the integral member including the insulating sleeve 33 and the electroconductive rod 34 is fitted to the main metal body 31. A metal support 32 is formed with a hole having a diameter larger than the outer diameter of the insulating sleeve 33. The metal support 32 is passed over the insulating sleeve 33 until the support abuts the flange 132.

A gap d is initially provided between the metal support 32 and the main metal body 31. The gap is closed by tightening a fastening bolt 35 to fasten the metal support 32 to the main metal body 31 so that a packing effect is provided between the flange 132 of the insulating sleeve and the main metal body 31 to thus provide a fluid-tight structure. A packing 39 can be provided if desired.

The connection between the conductors 36 of the cable 27 and the electroconductive rod 34 is achieved by soldering, by the use of a bolt 80 (FIG. 3) or by compression. A portion A of the insulating sleeve 33 and the insulation 37 of the cable 27, which is in contact with the ambient air, is covered with heatshrinkable tube 38 in order to prevent damage due to condensation of moisture. A bottom wall 42 of the connection box forms a boundary between the portion B and a low temperature portion A.

With this structure, the choice of the material of the insulating sleeve is extremely important. It has been experimentally proven that each of glass-reinforced epoxy resin and tetrafluoroethylene polymer exhibits desirable results.

Figure 3:
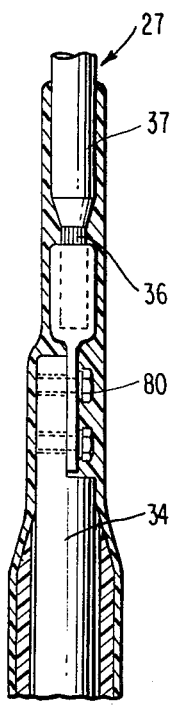
FIG. 3 illustrates a connection between a cable and an electroconductive rod.

The device of the invention, as shown in FIG. 3, has an extremely simple structure and compact size and is easily assembled at low cost.

What is claimed is:

1. A piercing fluid-tight connector device for an accumulation tank containing an ultra-low temperature fluid, comprising:

an ultra-low temperature cable for connection to said accumulation tank and having a conductor;

an insulating sleeve having a flange, said insulating sleeve having a female thread at an inner peripheral surface;

an electrically conductive rod having a male thread at an outer peripheral surface, said male thread being threadingly engaged with said female thread to integrally couple said sleeve and said rod;

means connecting said ultra-low temperature cable to said conductive rod;

a sealing member interposed between said male and said female threads to maintain fluid tightness therebetween;

a main metal body, said integrally coupled sleeve and rod extending through said main metal body;

a metal support disposed around said insulating sleeve; and at least one bolt for securing said metal support to said main metal body, said bolt being tightened to close a gap between the metal body and said metal support to provide a fluid-tight seal between said flange and said main metal body.

2. The piercing fluid-tight connector device of claim 1 further comprising a packing interposed between said flange and said main metal body to maintain fluid tightness therebetween.

3. The piercing fluid-tight connector device of claim 1 further comprising a heat-shrinkable tube covering a portion of said insulating sleeve which would otherwise be exposed to ambient air.

4. The piercing fluid-tight connector device of claim 1 wherein said cable is connected to said rod by soldering.

5. The piercing fluid-tight connector device of claim 1 wherein said cable is connected to said rod by compression.

6. The piercing fluid-tight connector device of claim 1 wherein said insulating sleeve is made of a material selected from the group consisting of glass-reinforced epoxy resin and tetrafluoroethylene polymer.

* * * * *